United States Patent [19]

Springer

[11] Patent Number: 4,503,439

[45] Date of Patent: Mar. 5, 1985

[54] THIN-FILM, COMPLIANT, NON-PRESSURE-POINT-TELEGRAPHING, ELECTROMAGNETIC READ/WRITE HEAD STRUCTURE

[76] Inventor: Gilbert D. Springer, 549 Torland Ct., Sunnyvale, Calif. 94087

[21] Appl. No.: 472,866

[22] Filed: Mar. 8, 1983

[51] Int. Cl.³ ............................................. G01D 15/12
[52] U.S. Cl. ..................................................... 346/74.5
[58] Field of Search ............... 346/74.5, 155; 360/125, 360/126

[56] References Cited

U.S. PATENT DOCUMENTS 4,414,554 11/1983 Springer ............................. 346/74.5

Primary Examiner—Thomas H. Tarcza
Attorney, Agent, or Firm—Kolisch, Hartwell, Dickinson & Anderson

[57] ABSTRACT

A thin-film, floppy and compliant, electromagnetic, read/write head structure which is adapted to be pressed against a magnetic imaging medium during reading and writing. Individual heads and associated structure are distributed like "bumps" on one face of a support substrate—the opposite face of which is the one designed to contact a medium. Other bumps, some connected functionally with the heads, and others isolated from the heads, are distributed over the same first-mentioned substrate face in a manner whereby they cooperate with the head bumps to minimize preferential point-pressure telegraphing (through the substrate to a recording medium) during compliant pressure-biased contact with such a medium.

4 Claims, 6 Drawing Figures

THIN-FILM, COMPLIANT, NON-PRESSURE-POINT-TELEGRAPHING, ELECTROMAGNETIC READ/WRITE HEAD STRUCTURE

BACKGROUND AND SUMMARY OF THE INVENTION

This invention pertains to a thin-film, floppy and compliant, electromagnetic read/write head array structure. More particularly, it pertains to such a structure which is intended to be used in compliant, pressure-biased contact with a magnetic imaging medium, with little appreciable medium wear occuring as a consequence of such contact.

A recently emerging magnetographic technology, born from the inventions disclosed in my prior-filed U.S. application which are identified as follows:

MAGNETIC IMAGING METHOD AND APPARATUS, Ser. No. 170,788, Filed 7/21/80 now U.S. Pat. No. 4,414,554;

MULTIPLE HEAD MAGNETIC RECORDING ARRAY, Ser. No. 381,923, Filed 5/26/82;

DIFFERENTIAL-PERMEABILITY FIELD-CONCENTRATING MAGNETIC WRITING HEAD, Ser. No. 381,922, Filed 5/26/82 (now abandoned);

has made possible high-resolution, high-quality, low-cost magnetic imaging. Disclosed in those applications are several different types of thin-film imaging heads, and an array of such heads, which may be used to create and read an endless variety of images, such as lettrs in the alphabet.

One of the important features which is offered by the thin-film structures disclosed in these three prior applications, is that the main supporting substrate in each structure takes the form of a glassy amorphous material known under the trade designation "Metgals". See, particularly, application Ser. No. 170,788, filed 7/21/80, entitled MAGNETIC IMAGING METHOD AND APPARATUS for a more detailed identification of this material. Among other important contributions made by Metglas in the head structures disclosed is that it is an extremely hard material which permits it, with extremely low-wear consequences (regarding a magnetic imaging medium), to be pressure-biased into contact with such a medium for the closest possible magnetic coupling during reading/writing operations. In addition, its flexibility allows a head organization constructed in accordance with those applications to comply easily with curvilinearity in a confronting medium.

While such compliant low-gear contact is strikingly offered by the structures disclosed in the above-referred-to three applications, because of the way in which the individual read/write heads are formed (somewhat like spaced islands or projections) on the face of a Metglas substrate, pressure-biasing during a read/write operation results in some point-pressure telegraphing through the substrate to a contacting medium. Thus, while low-wear performance is clearly offered, it is not as maximized as it could be in the absence of such point-pressure telegraphing.

A general object of the present invention therefore, is to provide, with respect to electromagnetic, thin-film, read/write head structures like those disclosed in the above-identified applications, additional structures which tends to "planarize" (fill-in topography) of that side of the Metglas substrate which bears the projecting head structure, thus to reduce appreciably and likelihood of point-pressure telegraphing like that just outlined.

A related object is to provide such an organization wherein a portion of the additional "planarizing" structure just mentioned is formed using part of the conductive highway system which connects with coils in the read/write head structures.

While the resulting structure, on the side of the substrate where the head coils are formed, has obvious non-planar topography, care is taken, according to the invention, to place the additional fill-in "planarizing" structure in such a manner that normally applied forces, spreading, as is customary, outwardlyt as they transmit through the substrate, converge vectorially no further than the opposite face of the substrate, thus to avoid any significant preferential pressure points.

According to a preferred embodiment of the invention, the proposed head array structure includes a thin-film, floppy and compliant web, or substrate, of the type mentioned above. Individual read/write heads, and associated energizing conductive structure, are distributed like "bumps" on one face of the substrate—the opposite face of which is designed to contact a magnetic imaging medium during a read/write operation. Other "bumps", some of which are formed over the connecting conductive structure for the heads, and others which are isolated like islands from the heads, are distributed over the first-mentioned substrate face in a manner whereby they cooperate with the head bumps to minimize point-pressure telegraphing in the kind of operational situations mentioned above.

Various other objects and advantages are attained by the invention, and these will become apparent as the description which now follows is read in conjunction with the accompanying drawings.

DETAILED DESCRIPTION OF THE INVENTION

For the purpose of illustration herein, a preferred embodiment of the invention is disclosed in the setting of a magnetic-image printer, wherein image writing only occurs—such having been found to be an area of particular utility for the invention.

Figure 1:
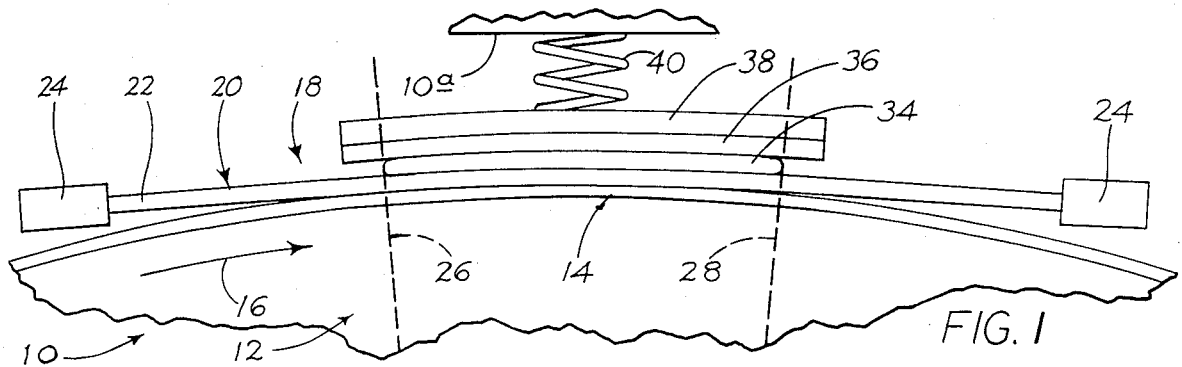
FIG. 1 is a simplified, fragmentary, schematic side elevation showing an operational arrangement of a head array structure constructed in accordance with the present invention, pressure-biased for an image-writing operation against a drum-supported magnetic imaging medium.
Figure 2:
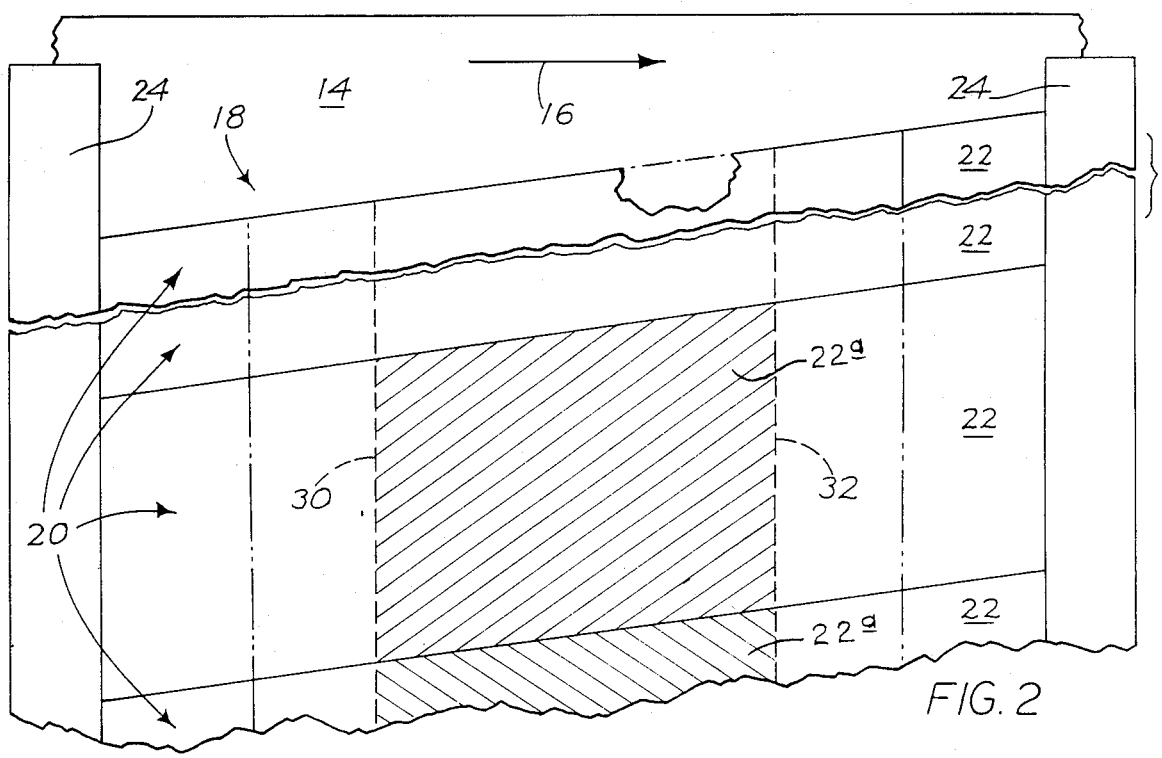
FIG. 2 is a fragmentary plan detail on about the same scale as, and taken generally from the top side of, FIG. 1 with pressure-biasing mechanism removed from the figure, and with two sets of shading lines used to call attention to certain ares of the figure.

Turing attention now to FIGS. 1 and 2, indicated generally at 10 (FIG. 1) is a portion of a magnetic-image printer, including a rotary drum 12 and an endless, belt-like conventional, magnetic imaging medium 14 carried on the drum. In the particular situation now being described, drum 12, when operating, rotates in the direction of arrow 16 at a speed of about 40-rpm.

Positioned, as will be explained, above drum 12 in FIG. 1 is a read/write head array arrangement 18, including plural, side-by-side adjacent, elongated, strip-like head array structures 20, constructed in accordance with the present invention. As can be seen in FIG. 2, structures 20 are discposed with their longitudinal axes substantially parallel to one another, and at a slight upwardly and to the right inclined angle relative to the direction (shown by arrow 16) in which medium 14 travels relatively beneath the array structures. The reason for this angular inclination will be explained shortly.

Generally describing the head array structures, each of which is substantially duplicative of the others, each includes a flexible Metglas web, or substrate, shown at 22, on the top side of which in FIG. 1 (the confronting side in FIG. 2) there are formed one hundred and twenty-eight electromagnetic read/write heads arranged in sixteen rows of eight heads each. The sixteen rows generally parallel the long axis of the structure, and the whole matrix of heads occupies a rhomboidal region 22a (two such regions being shaded in FIG. 2). The read/write axes for these heads extend substantially normal to the plane of FIG. 2, taking into account the obvious consideration that the head array structures are bent, as shown in FIG. 1 to place the undersides of webs 22 against medium 14.

Extending in FIG. 2 generally upwardly to the right and downwarly to the left of the head matrix in each structure are patterns of conductors, called herein a highway system, for energizing coils in the heads. These conductors extend to terminating connection pads, the outermost of which extend substantially to the dash-double-dot lines in FIG. 2.

The rhomboidal appearance of each head matrix is dictated by the necessity for an angular-offset head arrangement, such as that described in my above-referred-to application, Serial No. 381,329.The disclosure of that application is hereby incorporated by reference into this specification.

Suitably supporting opposite ends of webs 22 are frame pieces 24 which are mounted in the printer in any appropriate manner. These frame pieces are disposed in such a fashion that each web 22 is bent over medium 14 to place in contact with the medium an expanse on the underside of the web substantially co-extensive with the expanse on top of the web where projecting portions of the read/write heads are formed (the shaded expanses in FIG. 2). In FIG. 1, what might be thought of as the "angular" limits of these expanses, with respect to drum rotation, are depicted by dashed lines 26, 28. In FIG. 2 these same expanses are bounded, in a right-to-left sense, by dashed lines 30, 32, and in a top-to-bottom sense, by the lateral margins of each web 22. The respective areas, under the head array structures, in medium 14 which underly the expanses just described are referred to herein as "facial zones" in the medium.

Further describing head array structures 20, formed in accordance with the teachings in my above-mentioned prior U.S. patent applications, on the upper side of each web in FIG. 2, are various layers including electrical conductors and certain magnetic material which, together with the web, make up the plurality of read/write heads in the structure. In FIG. 1, this construction is represented schematically at 34 as a unitary lump on the top side of web 22. The actual construction and topography of this unified lump will be explained shortly. The lateral (right-to-left) limits of lumps 34 correspond with dashed lines 30, 32 in FIG. 2.

Completing a description of what is shown in FIG. 1, disposed in contact on to of lump 34 is a felt biasing pad 36 which is backed up, so-to-speak, by a suitable platen shown at 38. Pressure-biasing the platen and pad downwardly against lump 34 is a biasing spring 40 which acts between the platen shown and a fragment 10a of the frame in printer 10.

As was outlined earlier herein, it is intended that the head array structures of this invention, which are thin-film floppy and complaint devices, be specially adapted for what is referred to as expanse-type, pressure-biased, substantially uniform-pressure contact with a facial zone (identified earlier) in medium 14. To this end, and as will now be explained in detail, forming a part of what has been called a lump 34, along with the specific structural parts that cooperate with web 22 to make up read/write heads, is additional structure that tends to fill in what might be thought of as void expanses on the same side of the web so as to minimize pressure-point-telegraphing through the web to a medium under the pressure-biased operating situation depicted in FIG. 1.

Figure 3:
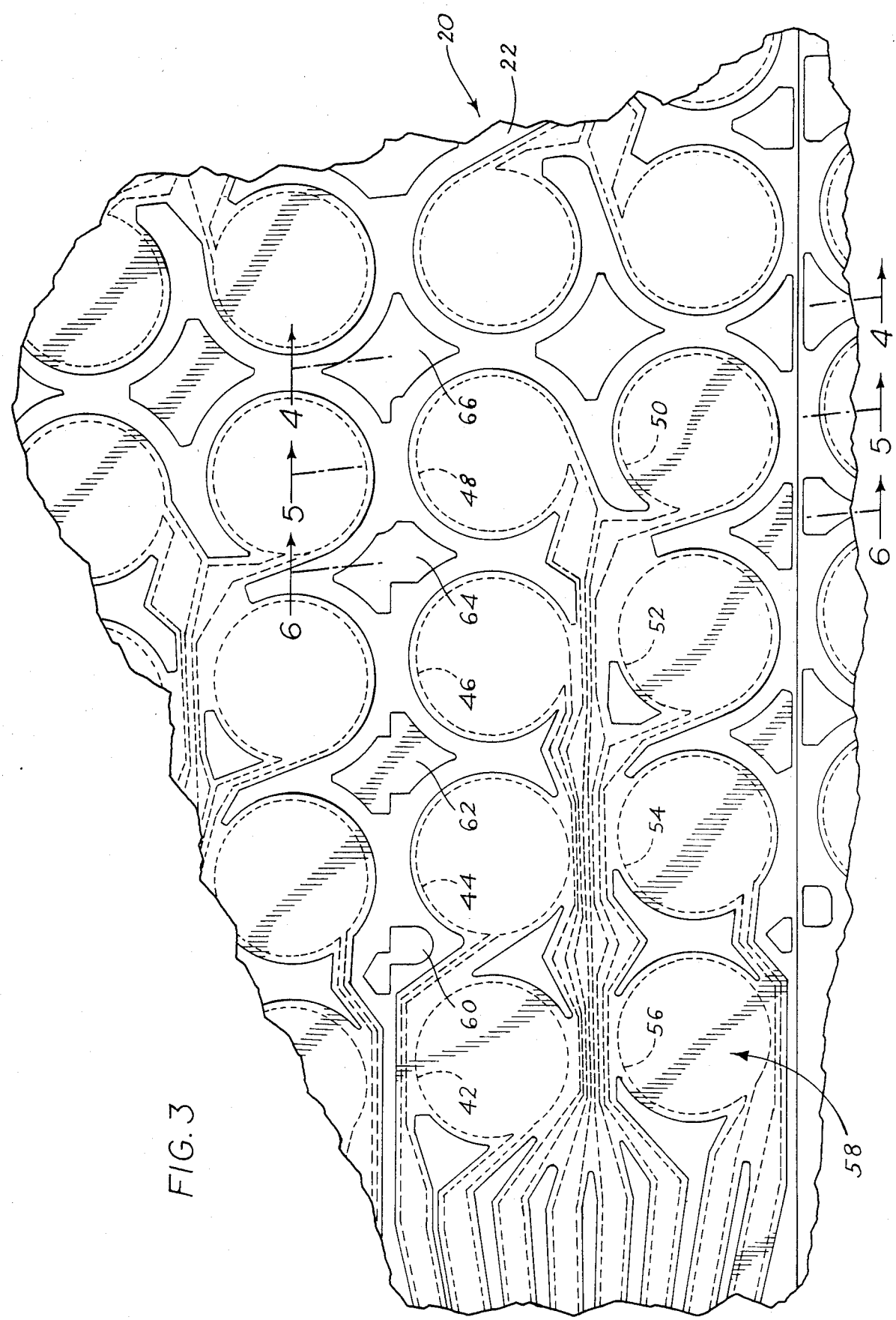
FIG. 3 (second sheet of drawings) is an enlarged fragmentary plan view of a portion of the head array structure shown in FIG. 2, illustrating what is referred to herein as point-pressure-telegraphing minimizing "planarization" structure.

Turning attention to FIG. 3, here there are shown enlarged fragments of portions of two of the head array structures seen in FIG. 2. In order to simplify the figure, a description thereof is given in particular only with reference to substantially one half the length of a portion of one of the head structures, inasmuch as the other half takes the form of a reversed mirror-image replica.

Indicated by dashed circles 42, 44, 46, 48, 50, 52, 54, 56 are the perimetral outlines of eight of the electrical energizing windings provided for eight of the read/write heads in the structure now being described. Extending, as can be seen, from the left side of FIG. 3, independently toward each of these eight windings, and shown also in dashed lines, are unnumbered conductors that form what is referred to herein as a highway system to the respective windings. For reasons which will be explained shortly, one will note that various ones of these conductors, at different locations, include differently shaped lateral bulges, or expanses.

Distributed over the windings and conductors just mentioned, ultimately as a final blanket in the head array structure, is a layer of magnetic material 58 having the perimeter outline shown, which generally repeats the pattern of windings and conductors. This material, where it overlies the windings, cooperates in the way described in the above-referred-to applications Ser. Nos. 170,788 and 381,922 to form parts of the read/write heads. The blanket of material just described extends toward the viewer in FIG. 3, from the near plane of web 22, about the same distance all over the blanket.

Distributed in what might be though of as the void expanses which would otherwise be remaining on the near surface of web 22 in FIG. 3 are different appropriately shaped islands, such as those shown at 60, 62, 64, 66, which are formed to include the same layers making up the other structure just described on the near face of the web. The final exposed layers in these islands are made up of the same magnetic material which produces layer 58, and the projections toward the viewer in FIG. 3 of these islands is substantially the same from the near face of the web as that just mentioned.

The generally circular projecting portions depicted in FIG. 3 are referred to herein as first-mentioned projecting land portions. The other projecting portions, including those which overly the conductors, and those which characterize the islands, are referred to both as second-mentioned projecting land portions, and as point-pressure-minimizing means. Of the second-mentioned projecting portions, those that overly the conductors, as can be seen, connect with those which overly the windings.

Figure 4:
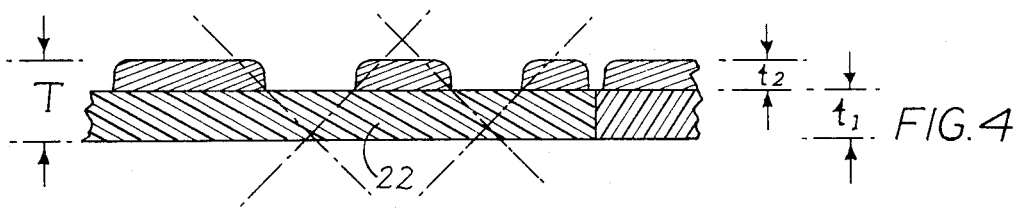
FIGS. 4, 5 and 6 are schematic fragmentary cross sections taken generally along lines 4—4, 5—5, 6—6, respectively, in FIG. 3, illustrating related topographies in the head structure, and disclosing how pressure-biasing forces diffuse through a substrate (in the structure) toward the face thereof which is intended to contact an imaging medium.
Figure 5:
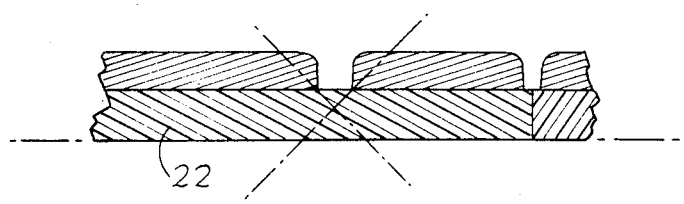
Figure 6:
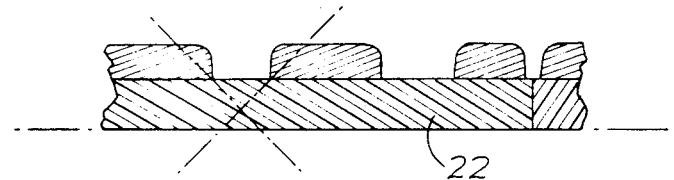

Turning attention now to FIGS. 4, 5 and 6, as mentioned earlier, here there are shown three different schematic cross sections taken along the respectively numbered view lines in FIG. 3, showing the topographical relationship between the projecting portions on the top side of web 22, and the web itself. As can be seen in FIG. 4, web 22 has an overall thickness, shown at $t_1$, of about 60-microns, and each of the projections above the top surface of the web in FIG. 4 has an overall thickness, shown at $t_2$, of about 45-microns. The combined thickness, T, is about 105-microns.

Experience has shown that, in a structure like that which is now being described, where pressure may be applied to a layer of material which lies incompletely (i.e., has margins) within the boundaries of an underlying layer, such pressure produces what might be thought of as diffusing force vectors which extend outwardly from the region of perimeter contact between the two, at about 45° angles into the broader (i.e., more expansive) layer. In FIG. 4, and assuming that pressure is applied downwardly to the structure shown therein on the tops of the projections depicted, diffusion of forces, in the plane of view, is shown by the two pairs of crossing dash-dot lines. It is significant to note that these lines, which represent force vectors in the plane of view, intersect above the bottom face of web 22.

FIGS. 5 and 6, taken from the other points of view mentioned, depicted similar force-vector situations.

What is significant to note is that, relative to the specific positiones of the read/write heads, the pads and configurations of the associated conductive lines including the selected lateral bulges in some of these lines, and the configurations and dispositions of the separate islands described, have all been chosen to assure that all force-vector "situations" between adjacent gapped areas in a head structure result in a crossing of force-vectors no further than the opposite face of web 22. It is this consideration which assures that, during a typical operating situation, like that depicted in FIG. 1, point-pressure telegraphing through web 22, to a contacting recording medium, is substantially eliminated. Put another way, the contact pressure which a medium, like medium 14, experiences is substantially uniform throughout the contact expanse area. Accordingly, extremely long-life low-wear operation is possible.

While a preferred embodiment of the invention has been discussed herein, it is appreciated that variations and modifications may be made without departing from the spirit of the invention.

It is claimed and desired to secure as letters patent:

1. A thin-film, floppy and compliant, electromagnetic read/write head array structure specially adapted for expanse-type, pressure-biased, substantially uniform-pressure contact with a facial zone in a relatively moving magnetic imaging medium, said structure comprising a thin-film, flexible web having opposed faces, with one including a defined expanse constructed for direct contact, over the area of said expanse, with such a zone, means distributed over the other face in said web in the form, generally, of plural projecting spaced land portions which cooperate with said web to form plural electromagnetic imaging heads arranged in a predetermined array substantially spanning another defined expanse on said other face which other expanse is substantially co-extensive with said first-mentioned expanse, and point-pressure-minimizing means also distributed over said other face in the form, generally, of plural projecting spaced land portions located in, and appreciably filling, selected spatial regions existing between said first-mentioned land portions, all of said land portions having substantially the same elevation relative to said other face, and said second-mentioned land portions cooperating with said first-mentioned land portions to minimize the likelihood, at any location in said co-extensive expanses, of preferential point-pressure telegraphing through said structure to a recording medium during compliant pressure-biased contact with such a medium.

2. The structure of claim 1, wherein some of said land portions which make-up said point-pressure-minimizing means connect with land portions included in said first-mentioned land portions.

3. The structure of claim 2, wherein others of said land portions which make-up said point-pressure-minimizing means take the forms of islands which are out of contact with said first-mentioned land portions.

4. The structure of claim 1, wherein said first and second-mentioned land portions are distributed in such a manner that forces, applied along axes substantially normal to the plane of said web, to confronting adjacent locations on adjacent land portions, where a gap exists therebetween, produce angled force vectors which converge progessing through the web and cross one another substantially no further from sad other face than said one face.

* * * * *